(12) United States Patent
Hsu et al.

(10) Patent No.: US 6,244,122 B1
(45) Date of Patent: Jun. 12, 2001

(54) SELF-ALIGNING DECOUPLED NUT MECHANISM

(75) Inventors: Chi-Hua Hsu, Chang-Hua (TW); Stuart Smith, Charlotte, NC (US); Gurpreet Singh, Cranston, RI (US)

(73) Assignee: University of North Carolina at Charlotte, Charlotte, NC (US)

( * ) Notice: Subject to any disclaimer, the term of this patent is extended or adjusted under 35 U.S.C. 154(b) by 0 days.

(21) Appl. No.: 09/164,784

(22) Filed: Oct. 1, 1998

(51) Int. Cl.[7] .................................................. F16H 25/20
(52) U.S. Cl. ...................... 74/89.15; 74/424.8 R
(58) Field of Search .......................... 74/89.15, 424.8 R, 74/459; 384/54, 55, 57, 58; 108/143; 400/354, 354.1

(56) References Cited

U.S. PATENT DOCUMENTS

| | | | |
|---|---|---|---|
| 2,702,393 | * | 2/1955 | Merton ..................................... 74/459 |
| 3,745,840 | * | 7/1973 | Guralnick ............................ 74/89.15 |
| 3,977,269 | | 8/1976 | Linley, Jr. . |
| 4,054,330 | * | 10/1977 | Luo ........................................ 384/53 |
| 4,372,223 | * | 2/1983 | Iwatani ................................ 74/89.15 |
| 4,418,371 | * | 11/1983 | Menden ................................ 400/320 |
| 4,528,607 | * | 7/1985 | Thompson ........................... 74/89.15 |
| 4,597,303 | * | 7/1986 | Nakaya ............................ 74/424.8 R |
| 4,813,830 | * | 3/1989 | Genequand et al. .................. 108/143 |
| 5,290,070 | * | 3/1994 | Deits et al. ............................. 384/55 |
| 5,332,321 | * | 7/1994 | Beauchamp et al. ................. 400/354 |
| 5,529,412 | * | 6/1996 | Jadrich et al. ........................ 400/354 |

FOREIGN PATENT DOCUMENTS 61-224171 * 10/1986 (JP) .

* cited by examiner

Primary Examiner—David A. Bucci
Assistant Examiner—William C. Joyce
(74) Attorney, Agent, or Firm—Alston & Bird LLP

(57) ABSTRACT

A feed screw and nut mechanism includes a nut having an internally threaded bore which threadingly engages an externally threaded feed screw. A runner bearing is attached to the nut and projects outwardly therefrom, and a dummy runner bearing is attached to the nut and projects outwardly therefrom and is angularly displaced from the runner bearing about the feed screw axis. The mechanism includes a stationary runner defining a runner surface that is engaged by the runner bearing to prevent rotation of the nut, and a dummy runner defining a dummy runner surface that engages the dummy runner bearing. The dummy runner and dummy runner bearing are biased toward each other such that the nut is rotatably biased in a direction to urge the runner bearing against the runner surface. The nut includes at least one rotatable drive bearing having a rotation axis perpendicular to the feed screw axis, and at least one rotatable driven bearing connected to the carriage and having a rotation axis perpendicular to both the feed screw axis and to the axis of the drive bearing. The drive and driven bearings make contact at their cylindrical surfaces to form a crossed bearing coupling for minimizing transmission to a carriage of force components which are not parallel to the axial direction along which the carriage travels. In a preferred embodiment, the nut mechanism includes a slave carriage, connected to the carriage, which supports a pair of crossed bearing couplings and which is rotatably connected to the nut to isolate the slave carriage from rotation of the nut about a transverse axis.

7 Claims, 3 Drawing Sheets

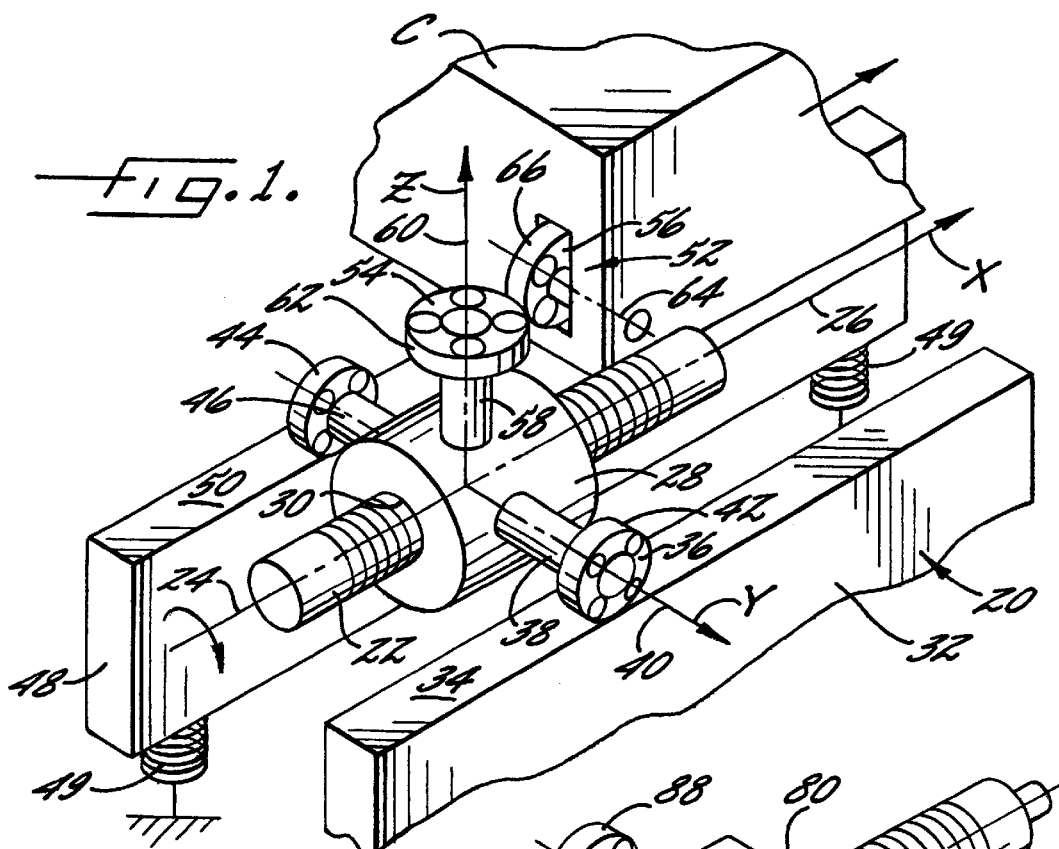
Fig. 1.
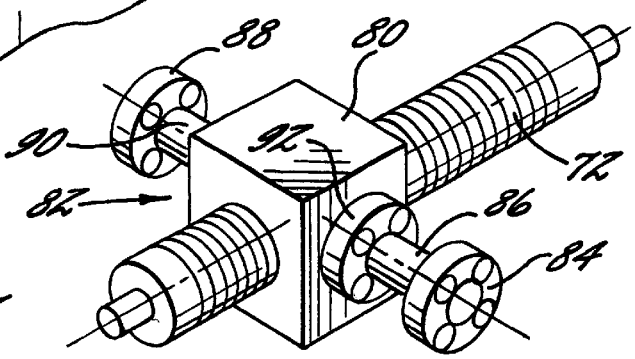
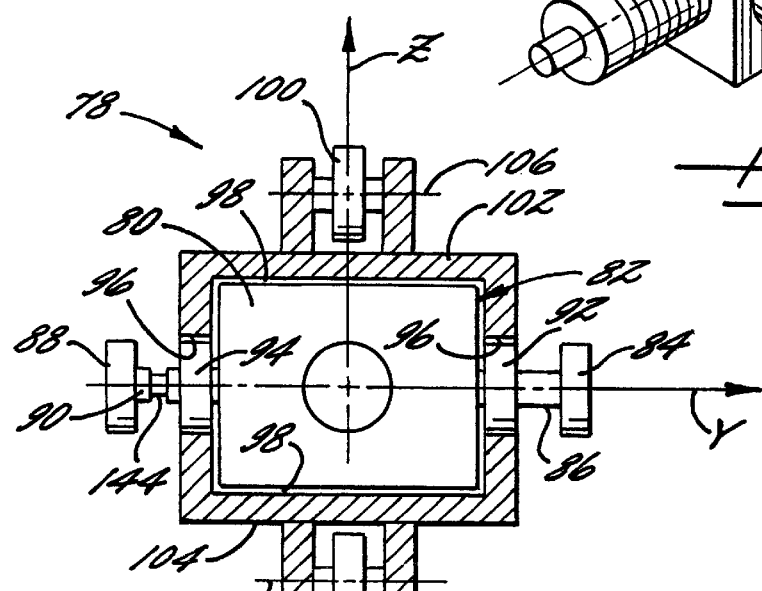
Fig. 2.
Fig. 3.

SELF-ALIGNING DECOUPLED NUT MECHANISM

FIELD OF THE INVENTION

The present invention relates to a nut mechanism for creating translational motion by engagement with a rotating threaded drive shaft or feed screw.

BACKGROUND OF THE INVENTION

In a variety of mechanical devices and systems, feed screw and nut arrangements are frequently used for providing translational motion to a moving carriage or the like. Typically, the nut is rigidly affixed to the carriage and is prevented from rotating about its axis, such that rotation of the feed screw causes the nut, and hence the carriage, to translate along the feed screw axis.

In some applications, precision of movement of the carriage is not of particular concern, and hence factors such as dimensional imperfections and friction which are common or inherent in feed screw/nut arrangements are relatively insignificant problems. However, in other applications requiring precise movement and positioning of a carriage, these factors can be significant problems. For example, small errors in the manufacture of the various components of a feed screw/nut arrangement can lead to various imperfections including misalignment of the feed screw axis with the direction of carriage movement, slight eccentricity of the nut with respect to the feed screw, and other problems. These dimensional imperfections can result in forces being exerted on the carriage in directions other than the intended direction of movement, which can cause deflection of the carriage or other undesirable consequences. Furthermore, in all feed screw/nut arrangements, there is friction between the rotating feed screw and the nut. In most conventional feed screw/nut arrangements wherein the nut is rigidly connected to the carriage, frictional forces exerted on the nut are transmitted to the carriage, which again can cause deflection of the carriage and other problems.

Because of problems such as those mentioned above, efforts have been made toward developing feed screw/nut arrangements having self-aligning nuts which can tolerate a certain amount of misalignment between the feed screw and the carriage or other structure on which the nut is carried. For example, U.S. Pat. No. 3,977,269 discloses a self-aligning nut mechanism having an elongate tubular nut body formed of a base portion and an internally threaded portion connected thereto. The internally threaded portion has a plurality of longitudinal slots that divide it into multiple elements whose thread formations are adapted for contact with the screw threads. The base portion of the body has a pair of oppositely disposed transverse slots enabling the threaded elements to have limited movement in radial directions with respect to the screw axis. Yieldable means are carried by the threaded elements for biasing them toward one another so as to maintain an intimate engagement of the threaded formations with the screw threads. An elongate spring sleeve surrounds and is concentric with the nut body, and has three pairs of oppositely disposed transverse slots spaced apart along the length of the sleeve. The three pairs of slots are indexed 90° with respect to one another to enable pivotal movement of the adjacent sleeve parts. One extreme sleeve part carries the nut body and the other extreme sleeve part is adapted to be secured to a reciprocating part of a machine.

The self-aligning nut of the '269 patent thus purports to address the problem of misalignment between a feed screw and the reciprocating machine part, by allowing the nut to resiliently conform to the feed screw and maintain threaded engagement therebetween, and by allowing the sleeve parts to move relative to each other to compensate for slight misalignment between the screw axis and the machine part. However, the '269 patent does not purport to address the problem of forces being transmitted to the machine part in directions other than the intended direction of movement of the machine part. Even though the nut and sleeve arrangement purportedly compensates for misalignment and remains engaged with the feed screw, such misalignment would result in forces on the nut and/or on the machine part in directions other than the intended direction of movement, which forces are undesirable where highly precise movement of the machine part is required. Additionally, frictional forces between the feed screw and the nut would also result in such undesirable forces.

SUMMARY OF THE INVENTION

The aforementioned problems are overcome and other advantages are realized by a nut mechanism in accordance with the present invention. In accordance with one preferred embodiment of the invention, a nut mechanism for translating a carriage along an X-axis includes an externally threaded feed screw which is rotatable about a fixed screw axis parallel to the X-axis, and a nut having an internally threaded bore which threadingly receives the feed screw. The nut mechanism further includes a stationary runner adapted to be fixed relative to the feed screw axis, the stationary runner defining a stationary runner surface which extends parallel to the X-axis, and a runner bearing attached to the nut and projecting outwardly therefrom along a Y-axis which is perpendicular to the X-axis. The runner bearing engages the stationary runner surface to prevent rotation of the nut when the feed screw is rotated such that rotation of the feed screw causes the nut to translate along the X-axis and the runner bearing to travel along the stationary runner surface. The mechanism also includes a dummy runner bearing attached to the nut and projecting outwardly therefrom along an axis which is perpendicular to the X-axis and angularly displaced about the screw axis from the runner bearing, and a dummy runner defining a dummy runner surface which extends parallel to the X-axis and engages the dummy runner bearing. The dummy runner bearing and dummy runner are biased toward each other so as to rotatably bias the nut in a direction to maintain the runner bearing in contact with the stationary runner surface. Thus, the dummy runner bearing and dummy runner ensure continuous contact of the runner bearing with the stationary runner surface such that rotation of the feed screw tends to cause translation of the nut rather than rotation of the nut with the feed screw.

Preferably, the nut mechanism includes bearing elements which substantially prevent the nut from transmitting forces to the carriage in directions nonparallel to the X-axis along which the carriage moves. Specifically, the nut mechanism in a preferred embodiment includes a drive bearing attached to the nut and projecting outwardly therefrom, the drive bearing having an outer generally cylindrical drive surface defining an axis which is perpendicular to the X-axis; and a driven bearing which has an outer generally cylindrical driven surface defining an axis and which is adapted to be attached to the carriage such that the axis of the driven surface is perpendicular to both the axis of the drive surface and the X-axis, and such that the driven surface is engaged by the drive surface to form a crossed bearing coupling. The drive and driven bearings advantageously are freely rotatable about their axes. The crossed bearing coupling formed by the cylindrical surfaces of the drive and driven bearings perpendicularly oriented relative to each other approximates a frictionless contact between a sphere and a flat surface wherein only forces normal to the flat surface can be transmitted to the surface by the sphere. Thus, any erroneous motions of the nut which would otherwise result in forces on the carriage in directions non-parallel to the X-axis will instead result in rotation of one or both of the drive and driven bearings about their axes, and accordingly the force transmitted from the drive bearing to the driven bearing is substantially entirely in a direction parallel to the X-axis. Nonaxial forces on the carriage are thereby minimized.

In accordance with another preferred embodiment of the invention, the nut mechanism includes a slave carriage connected with the nut and adapted to engage the carriage for transmitting force in the X-axis direction from the nut to the carriage while isolating the carriage from rotational motion of the nut about the Y-axis. The slave carriage is connected to the nut so as to be rotatable relative to the nut about the Y-axis which defines the axis of the runner bearing. Advantageously, a pair of bearings are mounted on opposite sides of the nut and connected to the slave carriage for rotatably connecting the slave carriage to the nut. Accordingly, erroneous rotational motion of the nut about the Y-axis will tend to be taken up by the rotatable connection with the slave carriage so that such motion of the nut does not result in nonaxial forces being transmitted to the carriage.

Preferably, the slave carriage mounts at least one drive bearing as described above. More preferably, a pair of drive bearings are mounted on one side of the slave carriage and another pair of drive bearings are mounted on an opposite side of the slave carriage. The drive bearings of each pair are spaced apart in the X-axis direction, and a driven bearing is disposed between the spaced-apart drive bearings to form a biaxial crossed bearing coupling permitting forces to be transmitted to the carriage in two opposite directions along the X-axis. The two biaxial crossed bearing couplings are preferably symmetrically disposed about the screw axis such that the driven bearings cooperate to exert axial force on the carriage along a line of action which is collinear with the screw axis.

In accordance with still another preferred embodiment of the invention, a nut mechanism is provided having a frame defining an interior space therein and having an opening for passage of the feed screw into the interior space; a stationary runner within the interior space and connected to the frame so as to be fixed relative to the screw axis, opposite sides of the stationary runner respectively defining a stationary runner surface which extends parallel to the X-axis and a dummy runner surface which is spaced apart from and parallel to the stationary runner surface; a nut disposed in the interior space and having an internally threaded bore adapted to threadingly receive the feed screw, the nut including a portion which is resiliently bendable relative to the remainder of the nut in a plane perpendicular to the X-axis; a runner bearing attached to the nut and projecting outwardly therefrom along a first axis which is perpendicular to the X-axis, the runner bearing engaging the stationary runner surface to prevent rotation of the nut when the feed screw is rotated such that rotation of the feed screw causes the nut to translate along the X-axis and the runner bearing to travel along the stationary runner surface; and a dummy runner bearing attached to the resiliently bendable portion of the nut and projecting outwardly therefrom along a second axis which is parallel to the first axis of the runner bearing and spaced apart therefrom, the dummy runner bearing engaging the dummy runner surface.

The resiliently bendable portion of the nut preloads the dummy runner bearing against the dummy runner surface so as to rotatably bias the nut in a direction to maintain the runner bearing in contact with the stationary runner surface. As a result, rotation of the feed screw causes the nut and, in turn, the carriage to translate along the X-axis direction.

The invention thus provides unique nut mechanisms having features for minimizing nonaxial forces exerted on a moving carriage caused by feed screw and/or nut misalignment, dimensional imperfections of components, and friction. In addition, the nut mechanism of the present invention preferably maintains the runner bearing in contact with the stationary runner surface such that rotation of the feed screw will not cause the nut to rotate due to frictional forces between the nut and feed screw, but instead will cause the nut to be translated along the feed screw so as to move the carriage in the X-axis direction.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 1 is a perspective view of a nut mechanism in accordance with a first preferred embodiment of the invention;

FIG. 2 is a perspective view of a feed screw and a nut in accordance with a second preferred embodiment of the invention;

FIG. 3 is a cross-sectional view of the nut of FIG. 2 and also showing a slave carriage assembly connected to the nut;

DETAILED DESCRIPTION OF THE DRAWINGS

Figure 4:
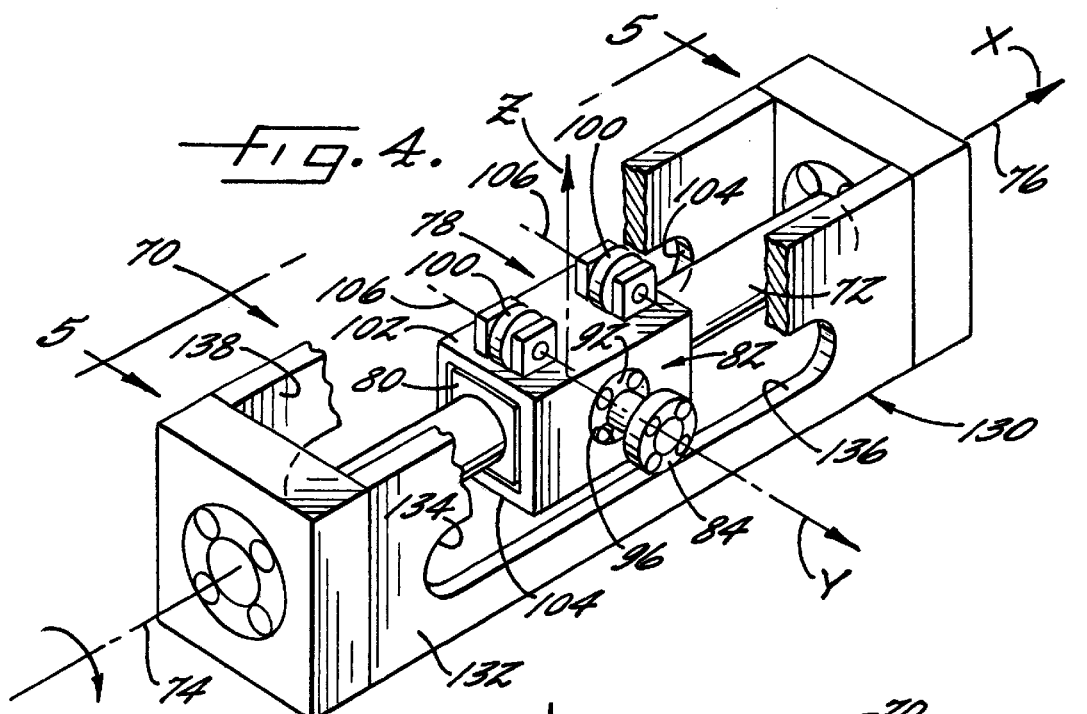
FIG. 4 is a perspective view of a complete nut mechanism in accordance with the second preferred embodiment of the invention, partially broken away to show the nut and slave carriage assembly.

The invention is now explained by reference to certain preferred embodiments thereof. It will be understood, however, that the invention is not limited to these embodiments, but can take a variety of other forms within the scope of the appended claims.

With reference to FIG. 1, a nut mechanism in accordance with a first preferred embodiment of the invention is broadly indicated by reference numeral 20. The nut mechanism 20 includes a feed screw 22 comprising an externally threaded shaft or rod oriented with its axis 24 nominally aligned along the direction of an X-axis 26 which defines the direction along which a carriage C is to be translated. The nut mechanism 20 further includes a nut 28 which has an internally threaded bore 30 formed therethrough and through which the feed screw 22 is threadingly received. The mechanism 20 also includes a stationary runner 32 which is fixed relative to the feed screw axis 24 and which defines a stationary runner surface 34 that extends parallel to the X-axis and is spaced from the nut 28.

The nut 28 includes a runner bearing 36 having a shaft 38 attached to the nut and projecting generally radially outward therefrom along a Y-axis 40 which is perpendicular to the X-axis. The runner bearing 36 has an outer generally cylindrical surface 42 which is coaxial with the Y-axis. The outer surface 42 of the runner bearing 36 contacts the stationary runner surface 34. Thus, clockwise rotation of the feed screw 22 (as viewed in the positive X-axis direction) causes the nut 28 to tend to also rotate clockwise because of friction between the feed screw and nut, but engagement of the runner bearing 36 with the stationary runner surface 34 prevents such rotation of the nut. Accordingly, the nut 28 is translated in the X-axis direction along the axis 24 of the feed screw, and the runner bearing 36 rolls along the stationary runner surface 34.

To maintain the runner bearing 36 in contact with the stationary runner surface 34 such that rotation of the feed screw 22 does not result in rotation of the nut 28 about its axis due to friction between the feed screw and nut, the nut mechanism 20 includes a dummy runner bearing 44 having a shaft 46 attached to the nut 28 and projecting generally radially outward therefrom, and a dummy runner 48 defining a dummy runner surface 50 that extends parallel to the screw axis 24 and contacts the dummy runner bearing 44. The dummy runner 48 and dummy runner bearing 44 are biased toward each other. The dummy runner bearing 44 is angularly displaced from the runner bearing 36 such that in a circumferential direction the runner bearing 36 and dummy runner bearing 44 are between the stationary runner surface 34 and dummy runner surface 50. Thus, the biasing force between the dummy runner bearing 44 and dummy runner surface 50 causes the nut to be rotatably biased in a direction to urge the runner bearing 36 against the stationary runner surface 34. In the embodiment illustrated in FIG. 1, the dummy runner bearing 44 and dummy runner surface 50 are diametrically opposite the runner bearing 36 and stationary runner surface 34, but it is not critical that they be diametrically opposite, and other angular displacements of less than 180° are also possible. The dummy runner 48 advantageously is movably mounted relative to the screw axis 24 and urged by resilient elements 49 toward the dummy runner bearing 44. However, it will be recognized that equivalently the dummy runner 48 can be fixed relative to the screw axis 24 and the dummy runner bearing 44 can provide the spring force. For example, the shaft 46 of the dummy runner bearing 44 can be made resiliently bendable for urging the dummy runner bearing 44 against the dummy runner surface 50.

The nut mechanism 20 also includes features for transmitting force to the carriage C in the axial direction of the X-axis while minimizing the transmission of nonaxial force components that are not parallel to the X-axis. Specifically, the mechanism 20 includes a crossed bearing coupling 52 comprising a drive bearing 54 connected to the nut 28 and a driven bearing 56 connected to the carriage C. The drive bearing 54 is connected to the nut 28 by a shaft 58 which projects generally radially outward from the nut along a Z-axis 60 which is perpendicular to the X-axis and to the Y-axis. The drive bearing 54 is rotatable about the Z-axis and includes an outer generally cylindrical surface 62 which is coaxial with the Z-axis. The driven bearing 56 is rotatably mounted on the carriage C such that it is rotatable about an axis 64 which is perpendicular both to the X-axis and to the Z-axis of the drive bearing 54. The driven bearing 56 has an outer generally cylindrical surface 66 which is in contact with the cylindrical surface 62 of the drive bearing 54. Thus, the crossed cylindrical surfaces 62 and 66 which are freely rotatable about their respective axes form an approximation of a frictionless contact between a sphere and a flat surface wherein only force that is normal to the flat surface can be transmitted from the sphere to the flat surface. In equivalent fashion, if the drive bearing 54 and driven bearings 56 were ideal bearings which could rotate without friction, then as long as the Z-axis of the drive bearing 54 remains perpendicular to the X-axis, the drive bearing 54 could only transmit force to the driven bearing 56 along a normal to the cylindrical surface 66 in the X-axis direction. Rotation of the nut 28 about the X-axis and/or the Z-axis would cause the drive bearing 54 to rotate about its axis so that force would continue to be exerted on the driven bearing 56 only in the X-axis direction. Similarly, translation of the nut 28 in the Y-axis and/or Z-axis directions would cause the drive bearing 54 and/or the driven bearing 56 to rotate about its axis so that force would continue to be exerted on the driven bearing 56 only in the X-axis direction. As a result, the nut mechanism of the present invention minimizes deflection of the carriage and other undesirable consequences caused by the exertion of nonaxial forces on the carriage C.

In reality, there will be some friction within the drive and driven bearings, and the frictional forces within the driven bearing 56 during rotation thereof will result in a torque being applied to the carriage C about the axis 64 of the driven bearing. However, this torque will exist only when the driven bearing is actually rotating and will typically be very small in relation to the axial force exerted on the carriage. Thus, the crossed bearing coupling 52 closely approximates a perfect point contact capable of transmitting purely normal force to the carriage in the X-axis direction.

It will be recognized that if the nut 28 rotates about the Y-axis, the contact between the drive and driven bearing surfaces will shift such that the normal to the driven bearing surface 66 will no longer be parallel to the X-axis, but will have some component in the Z-axis direction. Accordingly, the force exerted on the driven bearing 56 by the drive bearing 54 will have some Z-axis component. However, for small angle rotations of the nut about the Y-axis, this Z-axis force component will be very small in relation to the X-axis force component. It will also be noted that the force exerted on the carriage C by the drive bearing 54 is not collinear with the screw axis 24, and therefore the reaction force transmitted back through the nut mechanism will exert a bending moment on the feed screw 22, which may be undesirable in some applications.

FIGS. 2–7 depict a second preferred embodiment of the invention which provides a nut mechanism having features for reducing Z-axis force components on the carriage caused by rotation of the nut about the Y-axis, and also having features which ensure that the force exerted on the carriage has a line of action that is substantially collinear with the feed screw axis. Thus, with reference to FIG. 4, a nut mechanism 70 includes a feed screw 72 having an axis 74 oriented along an X-axis 76 which defines the direction of movement of a carriage (not shown) to be translated by the nut mechanism. The mechanism 70 further includes a nut assembly 78 which engages the feed screw 72 and is translated along the X-axis by rotation of the feed screw.

As best seen in FIGS. 2 and 3, the nut assembly 78 comprises a nut 80 and a slave carriage 82 which surrounds the nut 80. The nut 80 includes a runner bearing 84 mounted on a shaft 86 attached to the nut, and a dummy runner bearing 88 mounted on a shaft 90 attached to the nut and diametrically opposite the runner bearing 84, similar to the nut mechanism 20 of FIG. 1. Mounted on the runner bearing shaft 86 is a rotatable slave carriage bearing 92, and mounted on the dummy runner bearing shaft 90 is another rotatable slave carriage bearing 94. The slave carriage 82 includes bearing holes 96 in its two opposite sides for receiving the slave carriage bearings 92 and 94. The slave carriage 82 is thus rotatable about the Y-axis relative to the nut 80. The inside height of the slave carriage 82 in the Z-axis direction is greater than that of the nut 80 such that there are gaps 98 between the slave carriage 82 and the nut 80, permitting the nut to rotate about the Y-axis relative to the slave carriage. Therefore, the nut 80 is capable of rotating about the Y-axis without causing the slave carriage 82 to similarly rotate about the Y-axis, and accordingly, such rotational motions of the nut 80 will tend not to cause Z-axis force components to be exerted on the carriage which is connected to the slave carriage 82 as described below.

The slave carriage 82 includes features for transmitting axial force to a carriage. More particularly, the slave carriage 82 includes a pair of drive bearings 100 mounted on a wall 102 that is normal to the Z-axis, and another pair of drive bearings 100 mounted on a wall 104 on an opposite side of the nut 80 from the wall 102 and parallel to the wall 102. The two drive bearings 100 of each pair are spaced apart in the X-axis direction. The drive bearings 100 are rotatable about axes 106 that are parallel to the Y-axis. The drive bearings 100 on the one wall 102 and the drive bearings 100 on the other wall 104 are spaced equidistant from the feed screw axis 74 on diametrically opposite sides thereof. Thus, the drive bearings 100 are symmetric about the feed screw axis 74 in the XZ plane, so that the net axial force transmitted to a carriage by the drive bearings 100 will be collinear with the feed screw axis, thereby avoiding the imposition of a bending moment on the feed screw.

Figure 6:
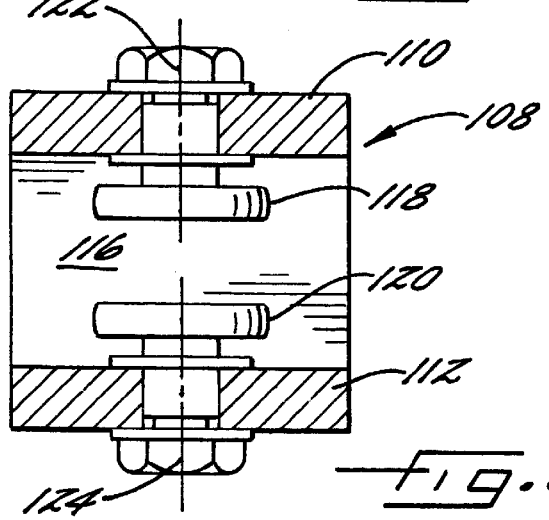
FIG. 6 is a cross-sectional view of an external connector for connecting the slave carriage to a carriage.
Figure 7:
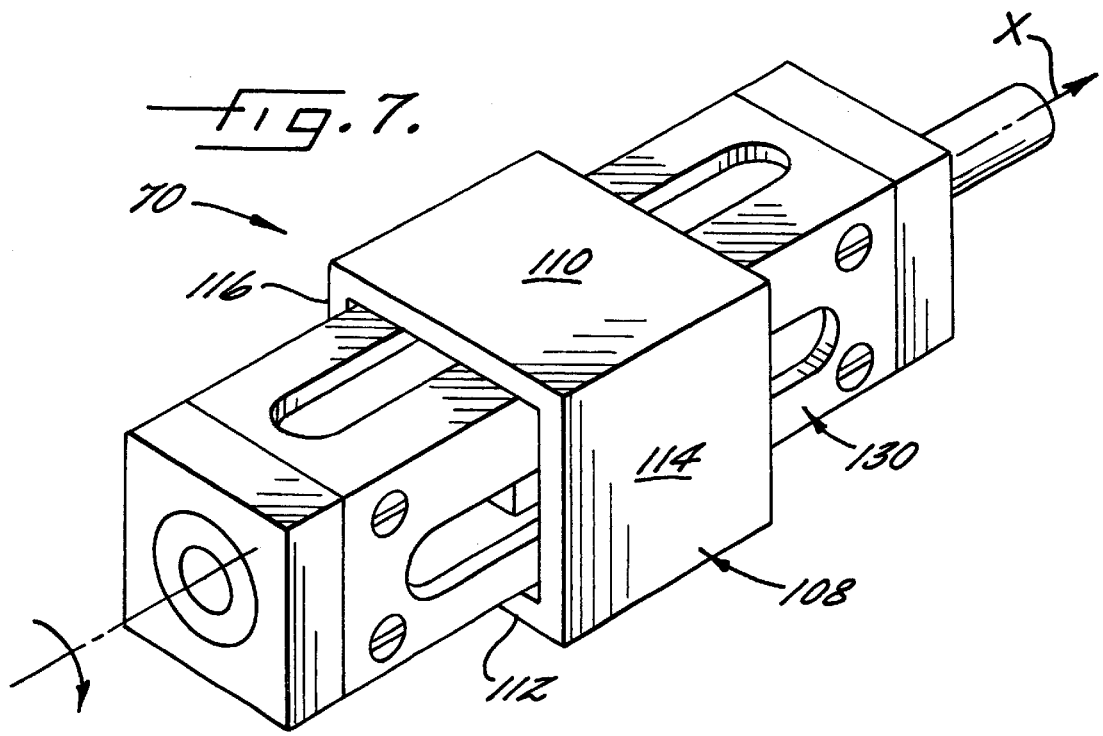
FIG. 7 is a perspective view of the mechanism of FIG. 4, also showing the external connector connected to the slave carriage.

The nut mechanism 70 also includes an external connector 108 as shown in FIGS. 6 and 7 for facilitating connection between the nut assembly 78 and a carriage. The external connector 108 comprises a four-walled open rectangular structure having a pair of opposite walls 110 and 112 which are spaced apart and parallel and are connected to each other at their ends by a pair of walls 114 and 116 which are spaced apart and parallel to each other. The wall 110 supports a driven bearing 118 disposed within the connector 108, and the opposite wall 112 supports a driven bearing 120 disposed within the connector 108 and facing the driven bearing 118. The driven bearings 118 and 120 are rotatable about axes 122 and 124, respectively, which are normal to the respective walls 110 and 112. The external connector 108 mounts around the slave carriage 82 with the wall 110 of the connector confronting the wall 102 of the slave carriage, and the opposite wall 112 of the connector confronting the corresponding opposite wall 104 of the slave carriage. The driven bearing 118 resides between the two drive bearings 100 on the wall 102, and the other driven bearing 120 resides between the two drive bearings 100 on the opposite wall 104 of the slave carriage. When the connector 108 is connected to the slave carriage 82, the axes 122 and 124 of the driven bearings 118 and 120 are perpendicular to the X-axis and to the axes 106 of the drive bearings 100. Thus, the driven bearing 118 and the corresponding pair of drive bearings 100 form a first crossed bearing coupling, and the driven bearing 120 and the corresponding pair of drive bearings 100 form a second crossed bearing coupling. The external connector 108 is adapted to be connected to a carriage for transmitting force from the nut mechanism 70 to the carriage.

The crossed bearing couplings formed by the drive bearings 100 and associated driven bearings 118 and 120 comprise biaxial couplings because the drive bearings 100 are capable of transmitting force to the driven bearings 118, 120 either in the positive X-axis direction or in the negative X-axis direction. As for the crossed bearing coupling 52 described above in connection with FIG. 1, the crossed bearing couplings of the nut mechanism 70 similarly approximate a frictionless contact of a sphere on a flat surface so that the forces exerted on the driven bearings 118, 120 are substantially parallel to the X-axis.

As shown in FIG. 4, the nut mechanism 70 includes a frame 130. A first wall 132 of the frame is adjacent the runner bearing 84 and includes an elongate slot 134 which defines a stationary runner surface 136 along which the runner bearing 84 rolls. A second wall 138 of the frame 130 on the opposite side of the nut assembly 78 from the first wall 132 and adjacent the dummy runner bearing 88 (not visible in FIG. 4) similarly includes an elongate slot 140 which defines a dummy runner surface 142 (best seen in FIG. 5) along which the dummy runner bearing 88 rolls. The slot 134 in the wall 132 is slightly larger in width than the diameter of the runner bearing 84. Consequently, if forces are applied to the nut that are greater than the preload provided by the dummy runner 88, the runner bearing 84 will lose contact with the runner surface 136 and make contact with the upper surface of the slot 134 and this upper surface will then function as a runner surface.

Figure 5:
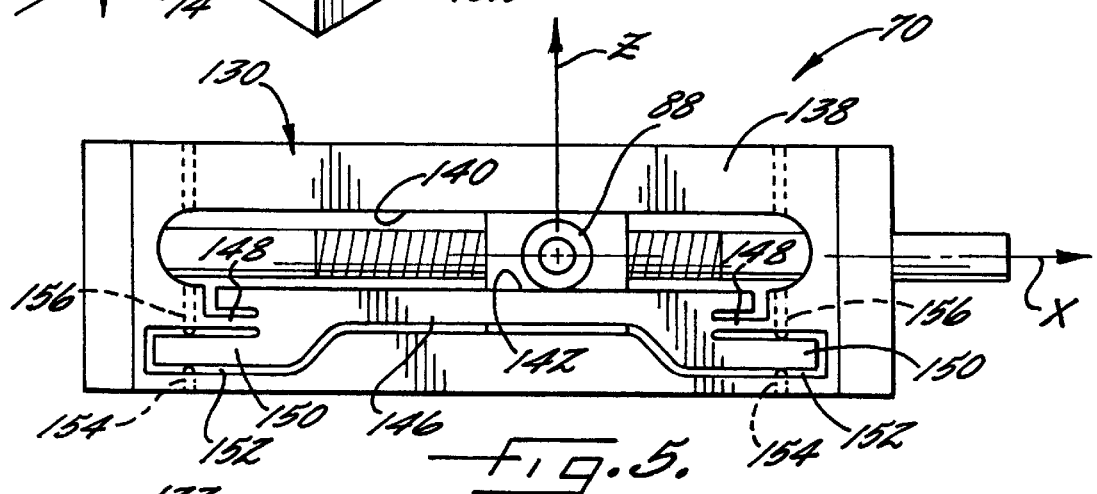
FIG. 5 is a side elevational view of the nut mechanism of FIG. 4.

As depicted in FIG. 3, the shaft 90 for the dummy runner bearing 88 includes a resiliently bendable portion 144 which allows the shaft 90 to bend in the YZ plane so that the shaft 90 behaves as a leaf spring. With reference to FIG. 5, the frame 130 includes features which allow the dummy runner surface 142 to be moved in the Z-axis direction for varying the degree of bending of the dummy runner bearing shaft 90. Specifically, the frame 130 includes a movable dummy runner 146 which defines the dummy runner surface 142. The dummy runner 146 is connected to the frame side wall 138 by connecting webs 148, and includes opposite end portions 150 which are disposed in cut-outs 152 formed in the wall 138 such that each end portion 150 is between one of the connecting webs 148 and an opposite portion of the wall 138 on the other side of the cut-out 152. The end portions 150 are engaged on one side by tensioning screws 154 which extend in the positive Z-axis direction, and on an opposite side adjacent the connecting webs 148 by tensioning screws 156 which extend in the negative Z-axis direction. Thus, advancing the screws 156 and retracting the screws 154 will cause the dummy runner 146 to be moved in the negative Z-axis direction so as to reduce the bending of the dummy runner bearing shaft 90, and retracting the screws 156 and advancing the screws 154 will cause the dummy runner 146 to be moved in the positive Z-axis direction so as to increase the bending of the shaft 90. In this manner, it is possible to vary the preload on the dummy runner bearing 88 which biases the nut 80 in the direction to maintain the runner bearing 84 in contact with the runner surface 136. However, the dummy runner bearing and dummy runner can be biased in a number of other manners, if desired.

Figure 8:
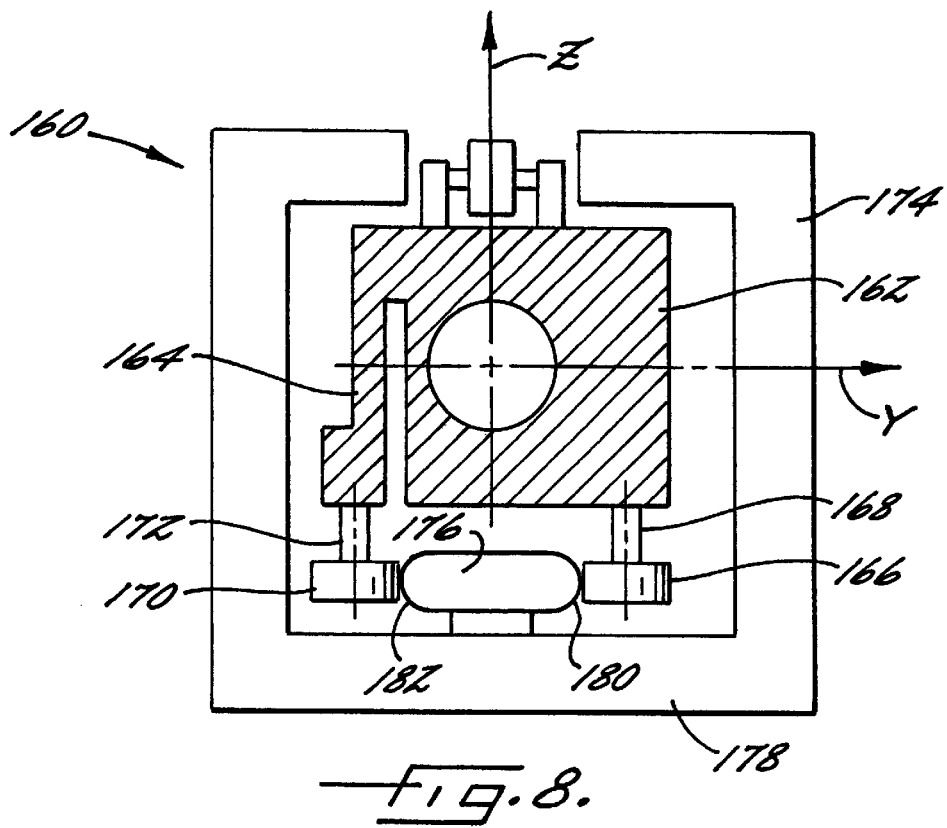
FIG. 8 is a cross-sectional view of a nut mechanism in accordance with a third preferred embodiment of the invention in which the nut includes a resiliently bendable portion for biasing the dummy runner bearing against the dummy runner surface.

FIG. 8 depicts a third preferred embodiment of a nut mechanism in accordance with the invention. The nut mechanism 160 includes a nut 162 which has a resiliently bendable portion 164 which is bendable relative to the remainder of the nut 162 in the YZ plane. A runner bearing 166 is mounted on the nut 162 and projects outwardly from one side thereof along an axis 168 that is parallel to the Z-axis. Mounted on the same side of the nut and spaced from the runner bearing 166 in the Y-axis direction is a dummy runner bearing 170 which projects outwardly from the nut along an axis 172 which is parallel to the Z-axis. Thus, the dummy runner bearing 170 is angularly displaced from the runner bearing 166 about the feed screw axis.

The nut mechanism 160 includes a frame 174 having a runner 176 mounted on a wall 178 thereof adjacent the runner bearing 166 and dummy runner bearing 170. The runner 176 defines a runner surface 180 on one side thereof and a dummy runner surface 182 on an opposite side thereof spaced from the runner surface in the Y-axis direction. The runner surface 180 and dummy runner surface 182 extend parallel to each other in the X-axis direction. The spacing between the runner surface 180 and dummy runner surface 182 in the Y-axis direction is slightly greater than the spacing between the outer surface of the runner bearing 166 and the outer surface of the dummy runner bearing 170 when the resilient portion 164 of the nut 162 is relaxed. Thus, there is a spring force between the dummy runner bearing 170 and the dummy runner surface 182 which causes the nut 162 to be rotatably biased to maintain the runner bearing 166 in contact with the runner surface 180.

Based on the foregoing description of certain preferred embodiments of the invention, it will be appreciated that the invention provides unique feed screw/nut mechanisms having features for maintaining contact between a runner bearing and stationary runner surface and for minimizing non-axial force components exerted on a carriage. Although the illustrated embodiments have been described in considerable detail, it will be understood that the invention is not limited to these details. Persons of ordinary skill in the art will readily comprehend various modifications and substitutions of equivalents which can be made to the described embodiments, and it is intended that such modifications and substitutions be encompassed within the scope of the appended claims. For example, while some of the described embodiments have shown the runner bearing and dummy runner bearing as being angularly spaced by 180° such that they are diametrically opposite each other, angular spacings other than 180° can be used. Furthermore, while the nut 162 of FIG. 8 is depicted as having an integrally formed resilient portion 164, the resilient portion may alternatively be a separately formed member which is attached to the nut 162. Other modifications and substitutions can be made without departing from the scope of the following claims.

What is claimed is:

1. A nut mechanism for translating a carriage along an X-axis, and comprising:

an externally threaded feed screw which is rotatable about a fixed screw axis parallel to the X-axis;

a nut having an internally threaded bore which threadingly receives the feed screw;

a stationary runner adapted to be fixed relative to the feed screw axis, the stationary runner defining a stationary runner surface which extends parallel to the X-axis;

a runner bearing attached to the nut and projecting outwardly therefrom along a Y-axis which is perpendicular to the X-axis, the runner bearing engaging the stationary runner surface to prevent rotation of the nut when the feed screw is rotated such that rotation of the feed screw causes the nut to translate along the X-axis and the runner bearing to travel along the stationary runner surface;

a dummy runner bearing attached to the nut and projecting outwardly therefrom along an axis which is perpendicular to the X-axis and angularly displaced about the screw axis from the runner bearing; and a dummy runner defining a dummy runner surface which extends parallel to the X-axis and engages the dummy runner bearing;

wherein the dummy runner bearing includes a shaft attached to and projecting outwardly from the nut, at least a portion of the shaft being resiliently bendable so as to bias the dummy runner bearing against the dummy runner surface so as to rotatable bias the nut in a direction to maintain the runner bearing in contact with the stationary runner surface.

2. A nut mechanism for translating a carriage along an X-axis, and comprising:

an externally threaded feed screw which is rotatable about a fixed screw axis parallel to the X-axis;

a nut having an internally threaded bore which threadingly receives the feed screw;

a stationary runner adapted to be fixed relative to the feed screw axis, the stationary runner defining a stationary runner surface which extends parallel to the X-axis;

a runner bearing attached to the nut and projecting outwardly therefrom along a Y-axis which is perpendicular to the X-axis, the runner bearing engaging the stationary runner surface to prevent rotation of the nut when the feed screw is rotated such that rotation of the feed screw causes the nut to translate along the X-axis and the runner bearing to travel along the stationary runner surface;

a dummy runner bearing attached to the nut and projecting outwardly therefrom along an axis which is perpendicular to the X-axis and angularly displaced about the screw axis from the runner bearing;

a dummy runner defining a dummy runner surface which extends parallel to the X-axis and engages the dummy runner bearing, at least one of the dummy runner bearing and dummy runner being biased toward the other so as to rotatable bias the nut in a direction to maintain the runner bearing in contact with the stationary runner surface;

a drive bearing attached to the nut and projecting outwardly therefrom, the drive bearing having an outer generally cylindrical drive surface defining an axis which is perpendicular to the X-axis; and a driven bearing which has an outer generally cylindrical driven surface defining an axis and which is adapted to be attached to the carriage such that the axis of the driven surface is perpendicular to both the axis of the drive surface and the X-axis, and such that the driven surface is engaged by the drive surface to form a crossed bearing coupling.

3. The nut mechanism of claim 2, wherein the drive and driven bearings are freely rotatable about their respective axes such that the crossed bearing coupling is substantially incapable of transmitting forces to the carriage in directions non-parallel to the X-axis.

4. The nut mechanism of claim 3, wherein the axis of the drive bearing defines a Z-axis which is mutually perpendicular to both the X-axis and the Y-axis.

5. A nut mechanism for translating a carriage along an X-axis by engagement with an externally threaded feed screw which is rotatable about a fixed screw axis parallel to the X-axis, and comprising:

a stationary runner adapted to be fixed relative to the X-axis, the stationary runner defining a stationary runner surface which extends parallel to the X-axis;

a nut having an internally threaded bore adapted to threadingly receive the feed screw;

a runner bearing attached to the nut and projecting outwardly therefrom along a Y-axis which is perpendicular to the X-axis, the runner bearing engaging the stationary runner surface to prevent rotation of the nut when the feed screw is rotated such that rotation of the feed screw causes the nut to translate along the X-axis and the runner bearing to travel along the stationary runner surface;

a drive bearing attached to the nut and projecting outwardly therefrom, the drive bearing having an outer generally cylindrical drive surface defining an axis which is perpendicular to the X-axis; and a driven bearing which has an outer generally cylindrical driven surface defining an axis and which is adapted to be attached to the carriage such that the axis of the driven surface is perpendicular to both the axis of the drive surface and the X-axis, and such that the driven surface is engaged by the drive surface to form a crossed bearing coupling.

6. The nut mechanism of claim 5, wherein the drive and driven bearings are freely rotatable about their axes.

7. The nut mechanism of claim 5, further comprising a second rotatable drive bearing having an outer generally cylindrical drive surface defining an axis, the two drive bearings being mounted side-by-side on the nut with their axes spaced apart in the X-axis direction and parallel to each other, the driven bearing being disposed between the drive bearings.

* * * * *